United States Patent
Wen et al.

(10) Patent No.: US 10,608,923 B2
(45) Date of Patent: Mar. 31, 2020

(54) METHOD AND APPARATUS FOR NETWORK SLICE DEPLOYMENT IN MOBILE COMMUNICATION SYSTEM

(71) Applicant: Beijing University of Posts & Telecommunications, Beijing (CN)

(72) Inventors: Xiangming Wen, Beijing (CN); Wanqing Guan, Beijing (CN); Yidi Shen, Beijing (CN); Zhaoming Lu, Beijing (CN); Luhan Wang, Beijing (CN)

(73) Assignee: Beijing University of Posts & Telecommunications, Beijing (CN)

( * ) Notice: Subject to any disclaimer, the term of this patent is extended or adjusted under 35 U.S.C. 154(b) by 209 days.

(21) Appl. No.: 15/835,487

(22) Filed: Dec. 8, 2017

(65) Prior Publication Data

US 2019/0166039 A1    May 30, 2019

(30) Foreign Application Priority Data

Nov. 27, 2017    (CN) .......................... 2017 1 1206784

(51) Int. Cl.
| | | |
|---|---|---|
| *H04L 12/721* | (2013.01) | |
| *H04L 12/751* | (2013.01) | |
| *G06F 9/455* | (2018.01) | |
| *H04L 12/715* | (2013.01) | |

(52) U.S. Cl.
CPC .......... *H04L 45/12* (2013.01); *G06F 9/45558* (2013.01); *H04L 45/02* (2013.01); *H04L 45/04* (2013.01); *G06F 2009/45595* (2013.01)

(58) Field of Classification Search
CPC ....... G06F 2009/45595; G06F 9/45558; H04L 45/02; H04L 45/04; H04L 45/12
See application file for complete search history.

(56) References Cited

U.S. PATENT DOCUMENTS

| | | | |
|---|---|---|---|
| 2012/0233302 A1* | 9/2012 | Kallin ................. | H04L 41/5025 709/221 |
| 2014/0092726 A1* | 4/2014 | Khan ..................... | H04L 45/64 370/221 |
| 2015/0172115 A1* | 6/2015 | Nguyen ................. | H04L 67/10 709/226 |
| 2016/0352645 A1* | 12/2016 | Senarath ................ | H04L 47/41 |
| 2016/0359678 A1* | 12/2016 | Madani ............... | H04L 63/1425 |
| 2017/0054595 A1* | 2/2017 | Zhang ................ | H04L 41/0896 |
| 2017/0079059 A1* | 3/2017 | Li ......................... | H04W 16/02 |
| 2017/0295409 A1* | 10/2017 | Simon ................. | H04L 12/5601 |
| 2017/0332421 A1* | 11/2017 | Sternberg .............. | H04W 76/11 |

(Continued)

*Primary Examiner* — Khaled M Kassim
(74) *Attorney, Agent, or Firm* — Westbridge IP LLC

(57) ABSTRACT

A method and an apparatus for deploying a network slice in a mobile communication system are disclosed. The method comprises the steps of mapping an underlying infrastructure network into an underlying network layer in a complex multilayer network model, and mapping a network slice into a network layer on the underlying network layer; and deploying the network slice based on the complex multilayer network model. In the process of deploying a network slice in a mobile communication system, the invention can accurately and flexibly manage the network resources and enhance the utilization of network resources, thereby avoiding the resource competition and ensuring the network communication quality.

9 Claims, 2 Drawing Sheets

(56) References Cited

U.S. PATENT DOCUMENTS

| | | | |
|---|---|---|---|
| 2018/0077024 A1* | 3/2018 | Zhang | H04L 41/044 |
| 2018/0368053 A1* | 12/2018 | Wei | H04W 48/10 |
| 2018/0368060 A1* | 12/2018 | Kedalagudde | H04W 48/18 |
| 2019/0124508 A1* | 4/2019 | Watfa | H04W 8/02 |
| 2019/0124671 A1* | 4/2019 | Starsinic | H04W 4/70 |
| 2019/0174322 A1* | 6/2019 | Deviprasad | H04W 16/10 |
| 2019/0229830 A1* | 7/2019 | Bruno | H04J 14/0227 |
| 2019/0230584 A1* | 7/2019 | Lou | H04W 48/16 |
| 2019/0260690 A1* | 8/2019 | Sun | H04L 47/20 |

* cited by examiner

METHOD AND APPARATUS FOR NETWORK SLICE DEPLOYMENT IN MOBILE COMMUNICATION SYSTEM

CROSS-REFERENCE TO RELATED APPLICATIONS

The present application claims priority from Chinese patent Application No. 2017112067843, filed on Nov. 27, 2017, the entire contents of which are incorporated herein by reference.

BACKGROUND

The present invention relates to communication technologies, and in particular to a method and an apparatus for network slice deployment in a mobile communication system.

In the future, mobile communication systems need to serve devices of various types and demands. Typical application scenarios include eMBB (enhanced Mobile Broadband), uRLLC (Ultra-Reliable and Low-Latency Communications) and mMTC (massive machine type of communication). Different scenarios have different requirements in terms of mobility, delay, charging and reliability. Network Slicing can use common network infrastructure to create different end-to-end virtual networks, allowing to configure and reuse network elements and features in each network slice to meet future flexible application requirements.

Although SDN (Software Defined Networking) and NFV (Network Functional Virtualization) are applied to implementation of network slices, there are many challenges, for example that the unreasonable deployment of network slices will lead to low resource utilization and prone to resource competition, so that the quality of the network communication will be affected and unguaranteed.

SUMMARY OF THE INVENTION

In view of the above, an objective of the present invention is to provide a method and an apparatus for network slice deployment in a mobile communication system. In the process of network slice deployment of mobile communication system, resources are more accurately and flexibly managed to improve utilization of network resources, try to avoid resource competition, and ensure network communication quality.

Based on the above object, the present invention provides a method for deploying a network slice in a mobile communication system, comprising the steps of:

mapping an underlying infrastructure network into an underlying network layer in a complex multilayer network model, and mapping a network slice into a network layer on the underlying network layer, and deploying the network slice based on the complex multilayer network model.

The step of mapping an underlying infrastructure network to an underlying network layer in a complex multilayer network model comprises the steps of:

mapping a physical server in the underlying infrastructure network into a node in the underlying network layer in the complex multilayer network model; and mapping an actual link between the physical servers into an edge between corresponding nodes in the underlying network layer.

The step of mapping a network slice to a network layer on the underlying network layer comprises the step of:

mapping a virtual network function of the network slice into a node in a network layer corresponding to the network slice;

mapping a virtual link between the virtual network functions of the network slice into an edge between the corresponding nodes in the network layer corresponding to the network slice; and mapping a virtual link between a virtual network function of the network slice and that of other network slice into an edge between the corresponding nodes of the corresponding different network layers.

The step of deploying the network slice based on the complex multilayer network model comprises the steps of:

deploying the virtual network function of the network slice; and deploying the connection relationship between the virtual network functions of the network slice, based on the complex multilayer network model.

The step of deploying the virtual network function of the network slice based on the complex multilayer network model comprises the steps of:

calculating an importance value of each node in the network layer corresponding to the network slice in the complex multilayer network model, and ranking each node by the importance value in descending order;

sequentially mapping each of the nodes into a node of the underlying network layer in accordance with the ranking; in the mapping process, the node of the underlying network layer into which a node to be mapped is mapped is a node with capacity satisfying the node to be mapped and having the largest importance value among each nodes of the underlying network layer without mapping relationship with the mapped nodes in the network layer corresponding to the network slice; and completing the deployment of the virtual network function of the network slice according to the mapping relationship between the nodes;

wherein the importance value of the node is calculated by the topology parameter, node capacity and link bandwidth of the node.

The step of deploying the connection relationship between the virtual network functions of the network slice based on the complex multilayer network model comprises the steps of:

ranking the connection relationships between virtual network functions of the network slice by the required bandwidth size; and sequentially deploying the connection relationships between the virtual network functions in accordance with the ranking;

where one of the connection relationships between the virtual network functions is deployed, determining two underlying network layer nodes corresponding to the two virtual network functions involved in the connection relationship between the virtual network functions; and then determining whether there is an edge between the two underlying network layer nodes satisfying the following condition: the edge has the shortest path among the edges corresponding to the physical links that meets the bandwidth requirement of the connection relationship between the virtual network functions; and deploying the connection relationship between the virtual network functions to the physical link corresponding to the determined edge.

The present invention further provides a apparatus for deploying a network slice in a mobile communication system, comprising:

a modeling module, for mapping an underlying infrastructure network into an underlying network layer in a complex multilayer network model and mapping a network slice into a network layer on the underlying network layer; and a deployment module, for deploying the network slice based on the complex multilayer network model.

The modeling module is specifically configured to map a physical server in the underlying infrastructure network into a node in the underlying network layer in the complex multilayer network model, wherein an actual link between the physical servers is mapped into an edge between corresponding nodes in the underlying network layer; and respectively map each virtual network function of the network slice into each node in the network layer corresponding to the network slice, wherein a virtual link between the virtual network functions of the network slice is mapped into an edge between corresponding nodes in the network layer corresponding to the network slice, and a virtual link between the virtual functions of the network slice and the other network slice is mapped into an edge between corresponding nodes in corresponding network layers.

In an embodiment, the deployment module comprises:

a virtual network function deployment unit, for deploying the virtual network function of the network slice based on the complex multilayer network model; and a connection relationship between virtual network functions deployment unit, for deploying the connection relationship between virtual network functions of the network slice based on the complex multilayer network model.

Preferably, the virtual network function deployment unit is specifically configured to calculate the importance value of each node in the network layer corresponding to the network slice in the complex multilayer network model, and ranking each node according to the importance value in descending order; sequentially mapping each of the nodes into a node of the underlying network layer in accordance with the ranking; wherein in the mapping process, the node of the underlying network layer into which a node to be mapped is mapped is a node with capacity satisfying the node to be mapped and having the largest importance value among each nodes of the underlying network layer without mapping relationship with the mapped nodes in the network layer corresponding to the network slice; and completing the deployment of the virtual network function of the network slice according to the mapping relationship between the nodes, wherein the importance value of the node is calculated by the topology parameter and the capacity of the node and the link bandwidth.

Preferably, the connection relationship between virtual network functions deployment unit is specifically configured to rank the connection relationships between the virtual network functions of the network slice by the required bandwidth size; and to sequentially deploying the connection relationships between the virtual network functions in accordance to the ranking; where one of the connection relationships between the virtual network functions is deployed, to determine two underlying network layer nodes corresponding to the two virtual network functions involved in the connection relationship between the virtual network functions; and then determine whether there is an edge between the two underlying network layer nodes satisfying the following condition: the edge has the shortest path among the edges corresponding to the physical links that meets the bandwidth requirement of the connection relationship between the virtual network functions; and deploying the connection relationship between the virtual network functions to the physical link corresponding to the determined edge.

In the technical solution of the embodiment of the present invention, the network slices and the underlying infrastructure network are mapped into the complex multilayer network model, and the deployment of network slices is performed by using the complex multilayer network model. It can save the deployment cost to the maximum based on meeting the requirements of network slice resources and achieve the purpose of more reasonable deployment of network slices, thereby avoiding the resource competition caused by the unreasonable deployment and ensuring the network communication quality.

During the deployment of virtual network functions, the node's importance is calculated by comprehensively considering the node's topology parameters (including the node's degree and betweenness centrality parameter) and the node's capacity and link bandwidth, and the deployment of nodes is performed by the order of importance of nodes. It enables that the virtual network functions corresponding to nodes having high importance can be deployed on the physical servers corresponding to nodes having high importance in the underlying network layer, so as to maximize the deployment cost savings while meeting the network slice resource requirements, and achieve a more reasonable deployment of network slices, and further avoid resource competition caused by unreasonable deployment and ensure network communication quality.

During the deployment of connection relationship between virtual network functions, Floyd algorithm is used to calculate the shortest path to meet the bandwidth requirement, so as to save the deployment cost to the maximum extent on the basis of meeting the network slice resource requirements and achieve the purpose of more reasonable deployment of the network slices, to avoid the resource competition caused by unreasonable deployment to a greater extent and ensure the quality of network communication.

DETAILED DESCRIPTION OF EXEMPLARY EMBODIMENTS

Figure 1:
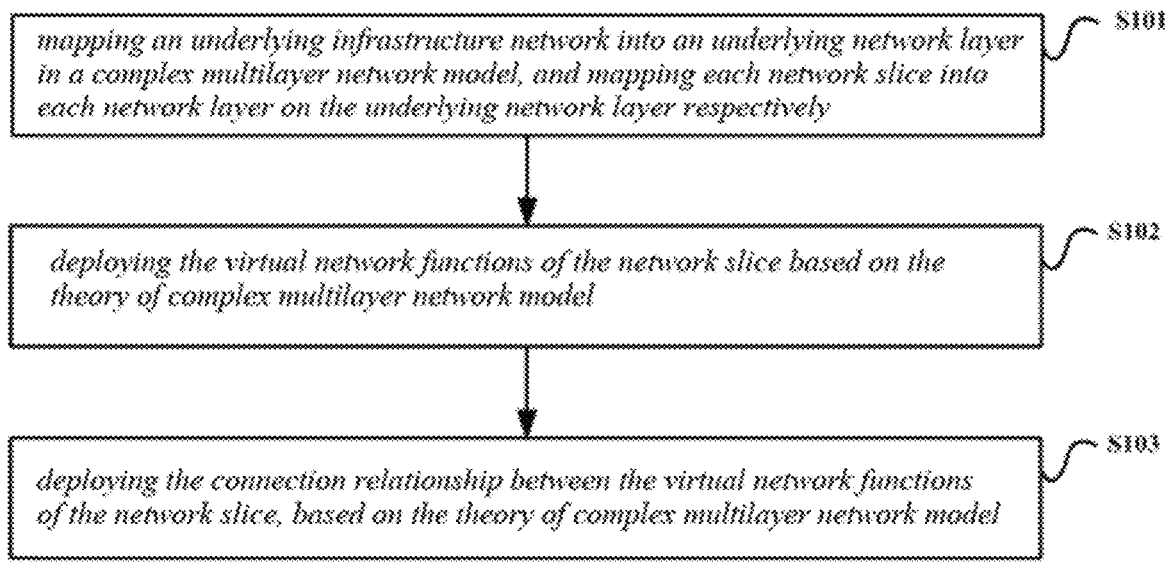
FIG. 1 is a flow chart of a method for deploying a network slice in a mobile communication system according to an embodiment of the present invention.

To make the objectives, technical solutions and advantages of the present invention clearer, the present invention is further described in detail with reference to the accompanying drawings.

The embodiments of the present invention are described in detail below, and examples of the embodiments are illustrated in the accompanying drawings, wherein the same or similar reference numeral denotes the same or similar element having the same or similar function throughout the context. The embodiments described with reference to the accompanying drawings are exemplary only to explain the present invention, and should not be construed as limitation on the present invention.

It would be understood by the skilled in the art that the singular forms "a", "an", "the" and "said" as used herein may include the plural forms as well, unless expressly stated. It would be further understood that when we call an element "connected" or "coupled" to another element, it can be directly connected or coupled to the other element, or there also may be an intermediate element between them. Further, "connection" or "coupling" as used herein may include a wireless connection or a wireless coupling. As used herein, the phrase "and/or" includes all or any combination of elements and all combinations of one or more of the associated items.

It should be noted that all the expressions of "first" and "second" in the embodiments of the present invention are used to distinguish two elements with the same name that are not the same or different parameters, and it can be seen that "first" and "second" is just used for convenience of description, it should not be construed as a limitation on the embodiments of the present invention.

The inventor of the present invention considers that as compared with the traditional complex network method, the multilayer complex network comprising a plurality of sub-networks and inter-layer connectivity can better characterize a real network, so that a network can be represented by a multilayer complex network in a mobile communication system and each layer of a multilayer complex network can represent different service-oriented slices and the underlying infrastructure network, respectively. The infrastructure network and a plurality of network slices loaded thereon are abstracted into a multilayer complex network model, and the complex network theory can be used to deploy the network slices in the mobile communication system. From the overall point of view, an end-to-end network slice communication quality assurance can be realized.

The technical solutions of the embodiments of the present invention are described in detail with reference to the accompanying drawings.

A method for deploying network slices in a mobile communication system according to an embodiment of the present invention, comprising the steps of:

S101: Mapping an underlying infrastructure network into an underlying network layer in a complex multilayer network model, and mapping each network slice into each network layer on the underlying network layer respectively.

In the multilayer complex network model, the entire multilayer complex network can be represented by M=(G, C); where G={$G_\alpha$;$\alpha \in${(1, . . . , M)}}, C={$E_{\alpha\beta} \subseteq X_\alpha \times X_\beta$;$\alpha,\beta \in${1, . . . , M},$\alpha \neq \beta$}, $G_\alpha$=($X_\alpha$,$E_\alpha$) $X_\alpha$={$x_1^\alpha$, . . . , $x_1^\alpha$,$x_{N_\alpha}^\alpha$}, M represents the total number of network layers in the complex multilayer network model, $x_i^\alpha$ represents the $i^{th}$ node in the $\alpha^{th}$ network layer, $N_\alpha$ represents the total number of nodes in the $\alpha^{th}$ network layer, $E_\alpha$ is an adjacency matrix with a size of $N_\alpha \times N_\alpha$ representing the edges between the nodes of the $\alpha^{th}$ network layer, wherein if the $i^{th}$ node is connected to the $j^{th}$ node in the $\alpha^{th}$ network layer, the value of the element of the $i^{th}$ row and the $j^{th}$ column of the $E_\alpha$ matrix is 1, otherwise the value is 0, and $E_{\alpha\beta}$ is an interaction matrix with size of $N_\alpha \times N_\beta$ representing the edges between the nodes of the $\alpha^{th}$ network layer and $\beta^{th}$ network layer, wherein if the $i^{th}$ node of the $\alpha^{th}$ network layer is connected to the $\beta^{th}$ node of the $\beta^{th}$ network layer, the value of the element of the $i^{th}$ row and the $j^{th}$ column of the $E_{\alpha\beta}$ matrix is 1, otherwise the value is 0.

In the present invention, a multilayer complex network model is created to represent a mobile communication system. The bottom layer of the model is an infrastructure network. The nodes in the layers represent a large number of physical servers. These servers are used to carry the virtual network functions of the upper layers. An edge between the nodes of the layers represents an actual link between physical servers.

In other words, when the underlying infrastructure network is mapped into the underlying network layer in the complex multilayer network model, each physical server in the underlying infrastructure network is specifically mapped into each node of the underlying network layer in the complex multilayer network model. An actual link between the physical servers is mapped into an edge between the corresponding nodes in the underlying network layer.

A plurality of network layers above the bottom layer respectively represent different service-oriented network slices. The nodes in the layer represent the virtual network functions (VNFs) of the network slices. An edge between the nodes in the layers represents a virtual link between the virtual network functions. An edge between the nodes in different layers represents a call of a network slice to the underlying resource and the inheritance relationship between the network slices. For example, if a node in a single-layer network abstracted by the network slice 1 is connected to a node in a single-layer network abstracted by the network slice 2, the virtual network function corresponding to the node in the network slice 1 uses the virtual network function in the network slice 2, commonly referred to inheritance.

That is, when each network slice is mapped into each network layer on the underlying network layer, each virtual network function (VNF) of the network slice is specifically mapped into each node in the network layer corresponding to the network slice, and a virtual link between the virtual network functions of the network slice is mapped into an edge between the corresponding nodes in the network layer corresponding to the network slice, and a virtual link between the virtual network functions of the network slice and the other network slice is mapped into an edge between the corresponding nodes of the corresponding different network layers.

Figure 2:
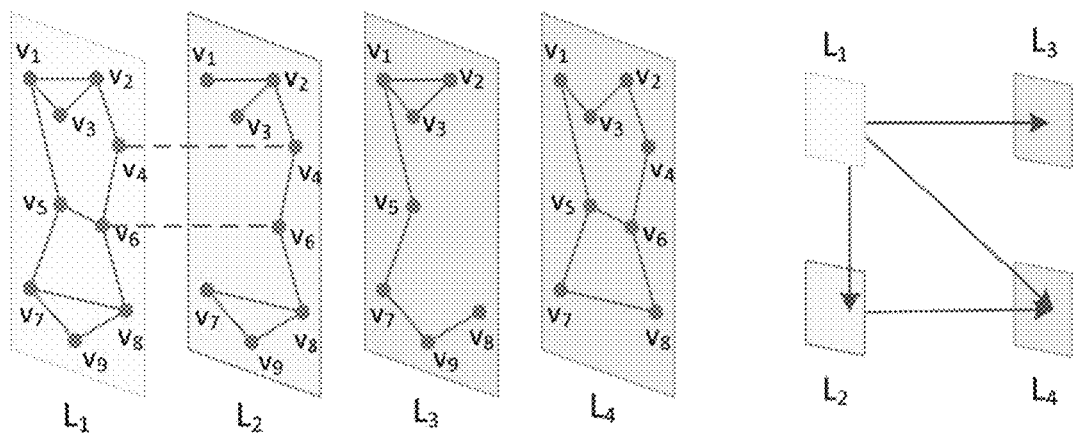
FIG. 2 is a schematic diagram of topology modeling of a network slice and an underlying physical network of a mobile communication system based on the complex network theory according to an embodiment of the present invention.

As shown in FIG. 2, different layers on the left represent different connection types or different connection relationships, and the right hand of FIG. 2 indicates the connection relationships between different layers, that is a cross-layer connection. In the present invention, the underlying infrastructure network may be abstracted and mapped into an L_1 network layer (the first layer network layer) in a complex multilayer network model, wherein the nodes represent physical network functions including an access network node, a transport network node and a core network node. The access network node mainly represents access facilities corresponding to multiple access modes, including WiMAX access, 4G/5G cellular network access, etc. The transport network node mainly represents various switching devices and relay routing devices, etc. The core network node mainly represents a variety of core network equipments.

The different network slices are respectively abstracted and mapped into the L_2, L_3 and L_4 network layers in the complex multilayer network model, that is, each of the network layers in the first network layer. Different slices have different connection structures and different scheduling of the underlying physical resources due to corresponding different service requirements, so that the topological structures and the node sets of network slices in different layers in the figure are different. The right-hand relationship diagram reflects the resource callings of different network slices, wherein each of L_2, L_3 and L_4 call L_1's physical resources, and L_4 also calls L_2's virtual resources.

After completing the modeling of the underlying infrastructure network and the network slice in the complex multilayer network model in the step S101, the differentiated cross-domain deployment strategy based on the network slice feature and the network topology feature in the present invention is that the deployment of the network slices is actually the deployment of the virtual functions and the connection relationships between the virtual network functions of the network slices, which will be described in detail in the following steps.

S102: Deployment of virtual network functions based on the theory of the complex multilayer network model.

Specifically, when a network slice corresponding to a network layer in a complex multilayer network model is requested, an importance value of each node in the network layer of the network slice is calculated, and each node is ranked by its importance value in descending order and sequentially mapped into a node of the underlying network layer according to the ranking respectively; in the mapping process, the node of the underlying network layer into which a node to be mapped is mapped is a node with capacity satisfying the node to be mapped and having the largest importance value among each nodes of the underlying network layer without mapping relationship with the mapped nodes in the network layer corresponding to the network slice. The deployment of the virtual network functions of the network slice is completed according to the mapping relationship between the node of the network layer of the network slice and the node of the underlying network layer.

That is, firstly, the node having the largest importance value in the network layer corresponding to the network slice is mapped, wherein it is determined whether the capacity of the node having the largest importance value in the underlying network layer can satisfy the node having the largest importance value in the network layer corresponding to the network slice; if yes, the node having the largest importance value in the network layer corresponding to the network slice is mapped into the node having the largest importance value in the underlying network layer; otherwise, it is further determined whether the capacity of the node having the second largest importance value in the underlying network can satisfy the requirement, until a node in the underlying network having the capacity to satisfy the requirement is picked out for mapping.

Next, the node having the second largest importance value in the network layer corresponding to the network slice is sequentially mapped, wherein the remaining nodes excluding the mapped nodes in the underlying network layer are ranked by their importance values again, and then the node whose capacity meets the requirement and whose importance value is higher than the others is picked out for mapping, until all the nodes in the network layer corresponding to the network slice are completely mapped.

Moreover, the deployment of the virtual network function of the network slice can be completed according to the mapping relationship between the node in the network layer of the network slice and the node in the underlying network layer.

The importance value of the above node can be calculated by comprehensively considering the topology parameters and the capacity of the node and the bandwidth of the link, as shown in the Formula 1:

$$NI(n_i) = NR(n_i) \times \left(\frac{d_i' + b_i'}{2}\right) \quad \text{(Formula 1)}$$

In Formula 1, $NI(n_i)$ is the importance value of the node $n_i$; $NR(n_i)$ can be calculated according to the Formula 2; $d_i'$ is a normalized value indicating the degree of the node n; which can be calculated according to the formula 3; $b_i'$ is a normalized value of the betweenness centrality of the node $n_i$ which can be calculated according to the Formula 4.

$$NR(n_i) = C(n_i) \times \sum_{l \in s(n_i)} BW(l) \quad \text{(Formula 2)}$$

$$d_i' = \frac{d_i}{N-1} \quad \text{(Formula 3)}$$

$$b_i' = \frac{2b_i}{(N-1)(N-2)} \quad \text{(Formula 4)}$$

In Formula 2, $C(n_i)$ is the capacity of the node $n_i$, $s(n_i)$ is the link directly connected to $n_i$, and $BW(l)$ is the available bandwidth of the current link l.

In Formulas 3 and 4, N is the total number of nodes in the network layer where the node $n_i$ is located; $d_i$ is the degree of the node $n_i$, wherein the degree of node is defined as the number of nodes directly connected to the node in the complex multilayer network model, which reflects the node's direct influence on the whole network and can be calculated by the Formula 5; $b_i$ is the betweenness centrality of the node $n_i$, wherein the betweenness centrality of node indicates the ability of carrying energy, information, etc. of the node in network transmission in the complex multilayer network model, and if a node has a larger betweenness centrality value, then it has stronger ability to transmit information and is more important in the network, $b_i$ can be calculated by the Formula 6, and the topology parameters of a node can be determined by the degree and the betweenness centrality of the node.

$$d_i = \sum_{j \in N} \delta_{ij} \quad \text{(Formula 5)}$$

In Formula 5, $d_i$ is the degree of node i; the parameter $\delta_{ij}$ is 1 when there is a directly connected path between node i and node j, otherwise, it is 0; and N is the total number of nodes in all the network layers of the complex multilayer network model.

$$b_i = \sum_{s \neq i \neq t} \frac{\sigma_{st}(i)}{\sigma_{st}} \quad \text{(Formula 6)}$$

In Formula (6), $b_i$ is the betweenness centrality of node i, $\sigma_{st}$ is the number of the shortest paths between node s and node t, and $\sigma_{st}(i)$ is the number of the shortest path passing through the node i in all the shortest paths between node s and node t.

S103: Deployment of the connection relationships between the virtual network functions of the network slice based on the theory of the complex multilayer network model.

In this step, the connection relationships between the virtual network functions involved in the network slice are ranked by the required bandwidth size; and the deployment of connection relationships between the virtual network functions is performed sequentially according to the ranking.

When one of the connection relationships between the virtual network functions is deployed, two underlying network layer nodes corresponding to two virtual network functions involved in the connection relationship between the virtual network functions is determined; and then it is determined whether the edge between the two underlying network layer nodes satisfies that it is the edge having the shortest path among the edges corresponding to the physical links that meets the bandwidth requirement of the connection relationships between the virtual network functions; and then the connection relationship between the virtual network functions is deployed to the physical link corresponding to the determined edge. Among them, the method of determining the edge having the shortest path between two nodes can use the Floyd algorithm.

Figure 3:
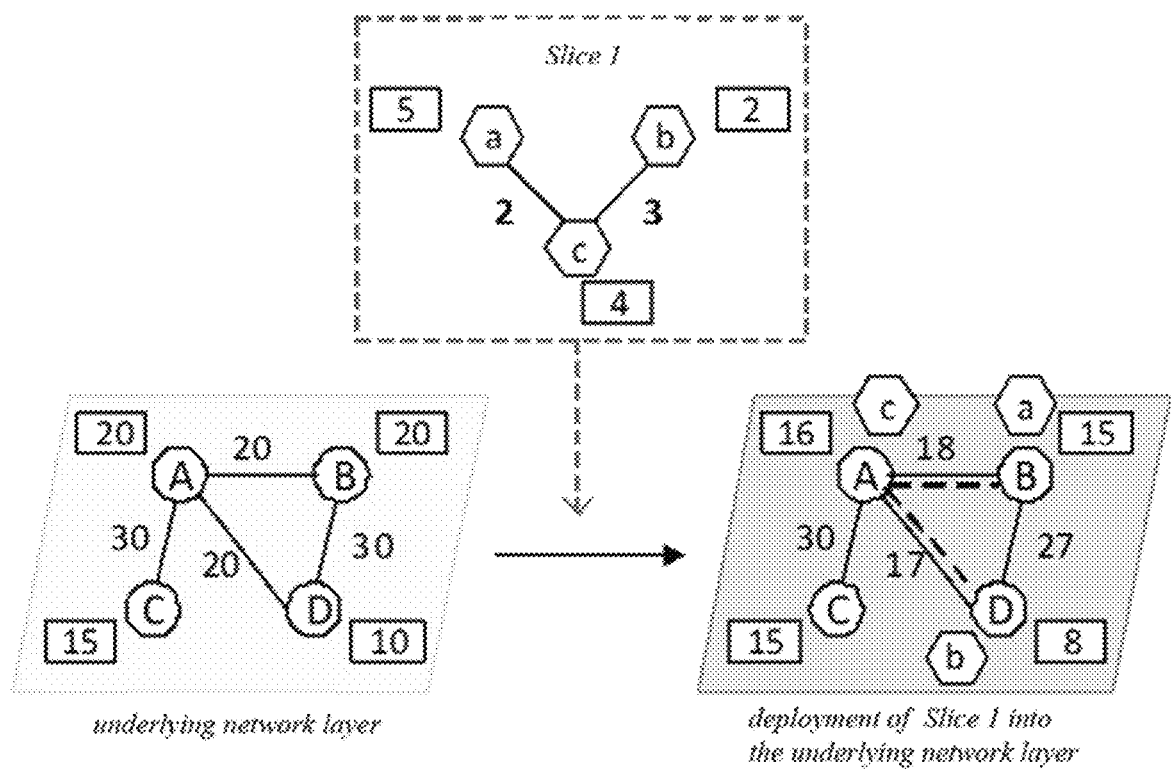
FIG. 3 is a schematic diagram of a specific deployment result of a network slice according to an embodiment of the present invention.

As shown in FIG. 3, the leftmost network layer represents the underlying network layer corresponding to the underlying infrastructure network. Before the request for network slice arrives, the available capacity of the node A in the underlying network layer is 20 units, and the available bandwidth between the links (A, C) is 30 units. When the request for network slice (Slice 1) arrives, the nodes in the network layers corresponding to the underlying infrastructure network and Slice 1 are ranked by the node importance, respectively. The importance ranking of the nodes in the network layer corresponding to Slice 1 is c, a, b; and the importance ranking of the nodes in the underlying network layer is A, B, D, C. Firstly, the node c in the network layer corresponding to Slice 1 is mapped, since the node A in the underlying network layer has the highest node importance value and meets the capacity requirement, so that c is mapped into A. Similarly, a is mapped into B, and b is mapped into D. After completing the mapping of each node in the network layer corresponding to the Slice 1, the link mapping can be completed by screening out the shortest path among the physical links in the underlying network layer satisfying the bandwidth requirement by the Floyd algorithm according to the bandwidth requirement of the virtual link in the network slice.

Figure 4:
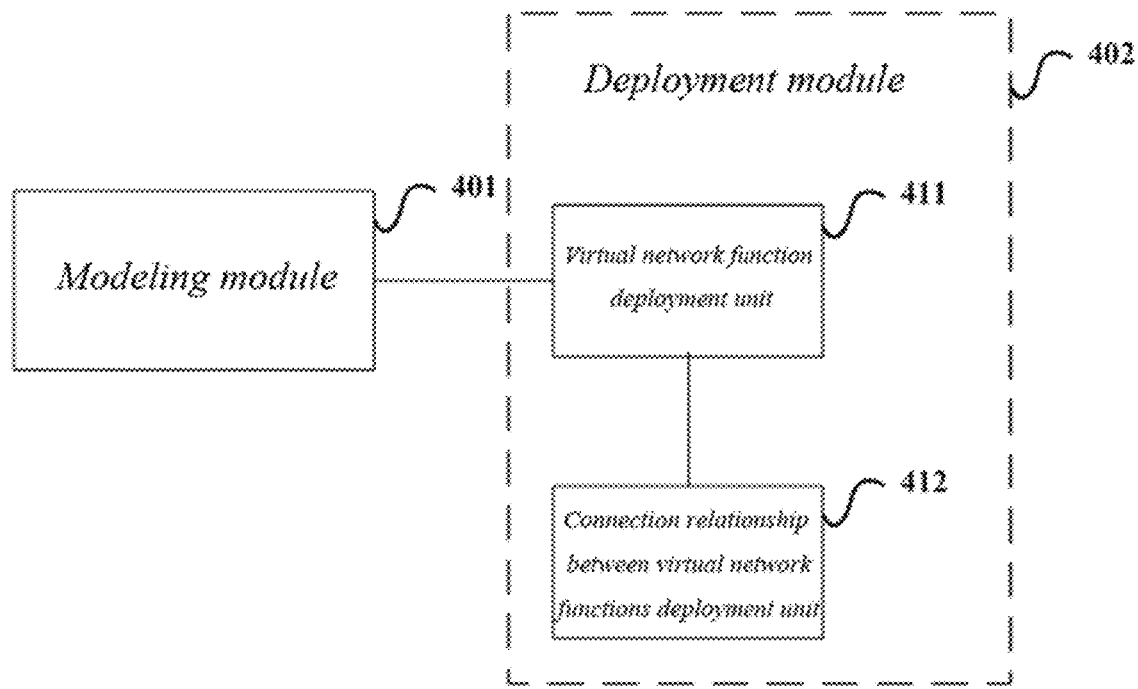
FIG. 4 is an internal structure schematic diagram of a network slice deployment apparatus in a mobile communication system according to an embodiment of the present invention.

Based on the above method, an apparatus for deploying a network slice in a mobile communication system according to an embodiment of the invention comprises: a modeling module 401 and a deployment module 402, as shown in FIG. 4.

The modeling module 401 is used to map the underlying infrastructure network into the underlying network layers in the complex multilayer network model and map each of the network slices into each network layer on the underlying network layer respectively. Specifically, the modeling module 401 is used for respectively mapping each physical server in the underlying infrastructure network into each node in the underlying network layers in the complex multilayer network model; mapping an actual link between the physical servers into an edge between the corresponding nodes in the underlying network layer; mapping each virtual network function of the network slice into each node in the network layer corresponding to the network slice respectively; mapping a virtual link between the virtual network functions of the network slice into an edge between the corresponding nodes in the network layer corresponding to the network slice; and mapping a virtual link between the virtual network functions of the network slice and other network slices into an edge between corresponding nodes in corresponding different network layers.

The deployment module 402 is configured to deploy a network slice based on the theory of the complex multilayer network model.

Specifically, the deployment module 402 can comprises: a virtual network function deployment unit 411 and a connection relationship between virtual network functions deployment unit 412.

The virtual network function deployment unit 411 is configured to deploy a virtual network function of the network slice based on the theory of the complex multilayer network model. Specifically, the virtual network function deployment unit 411 calculates the importance value of each node in the network layer corresponding to the network slice in the complex multilayer network model, and ranks each node by the importance value in descending order; and sequentially maps each node into a node in the underlying network layer according to the ranking respectively. In the mapping process, the node of the underlying network layer into which a node to be mapped is mapped is a node with capacity satisfying the node to be mapped and having the largest importance value among each nodes of the underlying network layer without mapping relationship with the mapped nodes in the network layer corresponding to the network slice. The deployment of the virtual network functions of the network slice is completed according to the mapping relationship between the nodes. The importance value of the node can be calculated by topological parameters and capacity of the node and the bandwidth of the link, as reference to the Formula 1, which is not described here.

The connection relationship between virtual network functions deployment unit 412 is configured to deploy the connection relationship between the virtual network functions of the network slice based on the theory of the complex multilayer network model. Specifically, the connection relationship between virtual network functions deployment unit 412 ranks the connection relationships between the virtual network functions involved in the network slice by the required bandwidth size; and sequentially perform the deployment of connection relationships between the virtual network functions according to the ranking. When one of the connection relationships between the virtual network functions is deployed, two underlying network layer nodes corresponding to two virtual network functions involved in the connection relationship between the virtual network functions are determined; and then it is determined whether the edge between the two underlying network layer nodes satisfies that it is the edge having the shortest path among the edges corresponding to the physical links that meets the bandwidth requirement of the connection relationships between the virtual network functions; and then the connection relationship between the virtual network functions is deployed to the physical link corresponding to the determined edge.

In the technical solution of the embodiment of the present invention, the network slices and underlying infrastructure networks are mapped into the complex multilayer network model, and the deployment of network slices is performed by using the theory of complex multilayer network model, so that it can save the deployment cost to the maximum based on meeting the requirements of network slice resources and achieve the purpose of more reasonable deployment of network slices, thereby avoiding the resource competition caused by the unreasonable deployment and ensuring the network communication quality.

During the deployment of virtual network functions, the node's importance is calculated by comprehensively considering the node's topology parameters (including the node's degree and betweenness centrality parameter) and the node's capacity and link bandwidth, and the deployment of nodes is performed by the order of importance of nodes. It enables that the virtual network functions corresponding to nodes having high importance can be deployed on the physical servers corresponding to nodes having high importance in the underlying network layer, so as to maximize the deployment cost savings while meeting the network slice resource requirements, and achieve a more reasonable deployment of network slices, and further avoid resource competition caused by unreasonable deployment and ensure network communication quality.

During the deployment of connection relationship between virtual network functions, Floyd algorithm is used to calculate the shortest path to meet the bandwidth requirement, so as to save the deployment cost to the maximum extent on the basis of meeting the network slice resource requirements and achieve the purpose of more reasonable deployment of the network slices, to avoid the resource competition caused by unreasonable deployment to a greater extent and ensure the quality of network communication.

It will be understood by those skilled in the art that the present invention includes apparatus related to performing one or more of the operations described in this application. These devices may be specially designed and manufactured for the required purposes, or may also include known devices in general purpose computers. These devices have computer programs stored therein, which are selectively activated or reconfigured. Such a computer program may be stored in a device (eg, a computer) readable medium, or in any type of medium suitable for storing electronic instructions and respectively coupled to a bus, including, but not limited to, any (Including a floppy disk, a hard disk, an optical disk, a CD-ROM, and a magneto-optical disk), a read only memory (ROM), a random access memory (RAM), an erasable programmable read-only memory, Erasable programmable read-only memory (EEPROM), EEPROM (Electrically Erasable Programmable Read-Only Memory), flash memory, magnetic card, or optical card. That is, a readable medium includes any medium that stores or transmits information in a form readable by a device (eg, a computer).

It will be understood by those skilled in the art that each block of the block diagrams and/or block diagrams and/or flowchart illustrations, and combinations of blocks in the block diagrams and/or block diagrams, and/or flowchart diagrams, can be implemented by computer program instructions. Those skilled in the art may understand that these computer program instructions may be provided to a processor of a general purpose computer, a special purpose computer, or other programmable data processing methods to be executed by a processor of a computer or other programmable data processing method The schemas and/or block diagrams and/or schemes identified in the flowchart illustrations and/or blocks are openly disclosed.

Those skilled in the art can understand that various operations, methods, steps in the flowcharts, measures, and schemes that have been discussed in the present invention may be alternated, changed, combined or deleted. Further, other steps, measures, schemes in the various operations, methods, and processes already discussed in the present invention may also be alternated, changed, rearranged, disassembled, combined or deleted. Further, steps, measures and solutions in the prior art which have various operations, methods and flows disclosed in the present invention may also be alternated, changed, rearranged, decomposed, combined or deleted.

Those of ordinary skill in the art should understand that, the discussion of any of the foregoing embodiments is merely exemplary, and is not intended to imply that the scope of the present disclosure (including the claims) is limited to these examples. In the spirit of the present invention, the above embodiment or Combinations of technical features in different embodiments may also be implemented, the steps may be carried out in any order, and many other variations of the different aspects of the invention as described above exist and are not provided in detail for the sake of brevity. Therefore, any omission, modification, equivalent replacement, or improvement made without departing from the spirit and principle of the present invention shall fall within the protection scope of the present invention.

The invention claimed is:

1. A method for deploying a network slice in a mobile communication system, comprising:

mapping an underlying infrastructure network into an underlying network layer in a complex multilayer network model; wherein, first nodes in the underlying network layer represent servers of the underlying infrastructure network and an edge between two first nodes represents a physical link between two servers;

mapping a network slice into a network layer on the underlying network layer in the complex multilayer network model; wherein, second nodes in the network layer represent virtual network functions of the network slice and an edge between two second nodes represents a virtual link between two virtual network functions; and deploying the virtual network functions of the network slice in the underlying network layer based on the complex multilayer network model; and deploying virtual links between any two virtual network functions of the network slice in the underlying network layer based on the complex multilayer network model; wherein said deploying the virtual network functions of the network slice in the underlying network layer based on the complex multilayer network model comprises:

calculating an importance value of each of the first nodes, and ranking the first nodes by the importance value in descending order;

calculating an importance value of each of the second nodes, and ranking the second nodes by the importance value in descending order; wherein the importance value of any of the first node and the second nodes is calculated based on the degree and the betweenness centrality of the node, the capacity of the node and the bandwidth of the node;

mapping each of the second nodes to a node of the first nodes in accordance with the ranking of the second nodes and the ranking of the first nodes; wherein, a second node is mapped to a first node with the capacity satisfying the capacity requirement of the second node and having a largest importance value among the first nodes which have not been mapped with any of the second nodes;
wherein the importance value of any of the first nodes and the second nodes is calculated based on the following formula:

$$NI(n_i) = NR(n_i) \times \left(\frac{d_i' + b_i'}{2}\right)$$

wherein, $NI(n_i)$ is the importance value of the node $n_i$; $d_i'$ is a normalized value indicating the degree of the node $n_i$; $b_i'$ is a normalized value of the betweenness centrality of the node $n_i$; wherein, $NR(n_i)$ is calculated based on the following formula:

$$NR(n_i) = C(n_i) \times \sum_{l \in s(n_i)} BW(l)$$

wherein, $C(n_i)$ is the capacity of the node $n_i$, $s(n_i)$ is the link directly connected to $n_i$, and $BW(l)$ is the available bandwidth of the link l.

2. The method of claim 1, wherein said mapping an underlying infrastructure network to an underlying network layer in a complex multilayer network model comprises:
mapping a server in the underlying infrastructure network into a first node in the underlying network layer in the complex multilayer network model; and
mapping a physical link between two servers into an edge between the corresponding first nodes in the underlying network layer.

3. The method of claim 1, wherein said mapping a network slice to a network layer on the underlying network layer comprises:
mapping a virtual network function of the network slice into a second node in the network layer corresponding to the network slice;
mapping a virtual link between two virtual network functions of the network slice into an edge between the corresponding second nodes in the network layer corresponding to the network slice; and
mapping a virtual link between two virtual network functions of the network slice and another network slice into an edge between the corresponding second nodes in different corresponding network layers.

4. The method of claim 1, wherein said deploying virtual links between any two virtual network functions of the network slice in the underlying network layer based on the complex multilayer network model comprises:
ranking the virtual links between any two virtual network functions of the network slice by the bandwidth required; and
deploying the virtual links between any two virtual network functions in the underlying network layer in accordance with the ranking;
wherein,
while deploying a virtual link between two virtual network functions, said deploying comprises:
determining two first nodes in the underlying network layer corresponding to the two virtual network functions;
determining whether there is a physical link between the two first nodes satisfying the following condition: the physical link has the shortest path among the physical links between the two first nodes that meet the requirement on bandwidth of the virtual link; and
in response to such a physical link is determined, deploying the virtual link to the physical link determined.

5. The method of claim 1, wherein the normalized value indicating the degree of the node $n_i$ is calculated based on the following formula:

$$d_i' = \frac{d_i}{N-1}$$

wherein, N is the total number of nodes in the network layer where the node $n_i$ is located; $d_i$ is the degree of the node $n_i$, wherein the degree of node is defined as the number of nodes directly connected to the node in the complex multilayer network model, which reflects the node's direct influence on the whole network.

6. The method of claim 1, wherein the normalized value of the betweenness centrality of the node $n_i$ is calculated based on the following formula:

$$b_i' = \frac{2b_i}{(N-1)(N-2)}$$

wherein, N is the total number of nodes in the network layer where the node $n_i$ is located; $b_i$ is the betweenness centrality of the node $n_i$, wherein the betweenness centrality of node indicates the ability of carrying energy and information of the node in network transmission in the complex multilayer network model.

7. An apparatus for deploying a network slice in a mobile communication system, comprising:
at least one processor and a memory; wherein the memory stores computer readable instructions, wherein the at least one processor executes the computer readable instructions to:
map an underlying infrastructure network into an underlying network layer in a complex multilayer network model; wherein, first nodes in the underlying network layer represent physical servers of the underlying infrastructure network and an edge between two first nodes represents an physical link between two physical servers;
map a network slice into a network layer on the underlying network layer in the complex multilayer network model; wherein, second nodes in the network layer represent virtual network functions of the network slice and an edge between two second nodes represents a virtual link between two virtual network functions;
calculate an importance value of each of the first nodes, and ranking the first nodes by the importance value in descending order;
calculate an importance value of each of the second nodes, and ranking the second nodes by the importance value in descending order; wherein, the importance value of any of the first node and the second nodes is calculated based on the degree and the betweenness centrality of the node, the capacity of the node and bandwidth of the node;
map each of the second nodes to a node of the first nodes in accordance with the ranking of the second nodes and the ranking of the first nodes; wherein, a second node is mapped to a first node with the capacity satisfying the capacity requirement of the second node and having a largest importance value among the first nodes which have not been mapped with any of the second nodes; and deploy the virtual links between the virtual network functions of the network slice in the underlying network layer based on the complex multilayer network model;

wherein the importance value of any of the first nodes and the second nodes is calculated based on the following formula:

$$NI(n_i) = NR(n_i) \times \left( \frac{d_i' + b_i'}{2} \right)$$

wherein, $NI(n_i)$ is the importance value of the node $n_i$; $d_i'$ is a normalized value indicating the degree of the node $n_i$; $b_i'$ is a normalized value of the betweenness centrality of the node $n_i$; wherein, $NR(n_i)$ is calculated based on the following formula:

$$NR(n_i) = C(n_i) \times \sum_{l \in s(n_i)} BW(l)$$

wherein, $C(n_i)$ is the capacity of the node $n_i$, $s(n_i)$ is the link directly connected to $n_i$, and $BW(l)$ is the available bandwidth of the link l.

8. The apparatus of claim 7, wherein the at least one processor executes the computer readable instructions further to:

map a physical server in the underlying infrastructure network into a first node in the underlying network layer in the complex multilayer network model;

map a physical link between two physical servers into an edge between the corresponding first nodes in the underlying network layer;

map a virtual network function of the network slice into a second node in the network layer corresponding to the network slice;

map a virtual link between two virtual network functions of the network slice into an edge between the corresponding second nodes in the network layer corresponding to the network slice; and map a virtual link between two virtual network functions of the network slice and another network slice into an edge between the corresponding second nodes in different corresponding network layers.

9. The apparatus of claim 8, wherein the at least one processor executes the computer readable instructions further to:

rank the virtual links between the virtual network functions of the network slice by the bandwidth required; and deploy the virtual links between the virtual network functions in the underlying network layer in accordance with the ranking;

wherein, while deploying a virtual link between two virtual network functions, the at least one processor executes the computer readable instructions further to:

determine two first nodes in the underlying network layer corresponding to the two virtual network functions;

determine whether there is a physical link between the two first nodes satisfying the following condition: the physical link has the shortest path among the physical links between the two first nodes that meet the requirement on the bandwidth of the virtual link; and in response to such a physical link is determined, deploy the virtual link to the physical link determined.

* * * * *